M. LUPINSKI.
SAFETY DEVICE FOR REFRIGERATOR MACHINES.
APPLICATION FILED MAY 24, 1918.

1,280,259.

Patented Oct. 1, 1918.

Inventor
Max Lupinski
By Erwin J Wheeler
Attorneys.

UNITED STATES PATENT OFFICE.

MAX LUPINSKI, OF MILWAUKEE, WISCONSIN.

SAFETY DEVICE FOR REFRIGERATOR-MACHINES.

1,280,259.   Specification of Letters Patent.   Patented Oct. 1, 1918.

Application filed May 24, 1918. Serial No. 236,316.

*To all whom it may concern:*

Be it known that I, MAX LUPINSKI, a citizen of the United States, residing at Milwaukee, county of Milwaukee, and State of Wisconsin, have invented new and useful Improvements in Safety Devices for Refrigerator-Machines, of which the following is a specification.

My invention relates to improvements in safety devices for refrigerator machines.

I am aware of the fact that the cylinder heads on the pipes of refrigerator machines sometimes break, in which case ammonia, or other gas, under great pressure, escapes very rapidly and it becomes very difficult or impossible to stop the escape of such gas.

The object of my present invention is therefore to provide an automatic device for immediately stopping the escape of such gas the instant the compressor heads blow out, or any of the pipes connected with such compressor break.

My invention is further explained by reference to the accompanying drawings, in which—

Like parts are identified by the same reference numerals throughout the several views.

Figure 1:
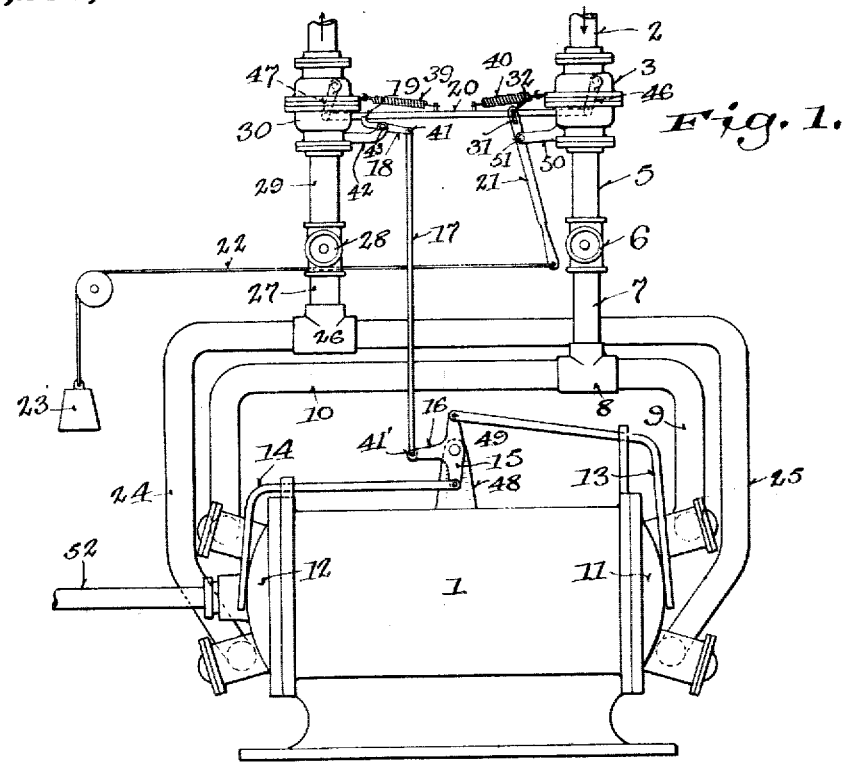
Figure 1 is a side view of the device, in which automatic closing valves are shown in connection with the compressor.
Figure 2:
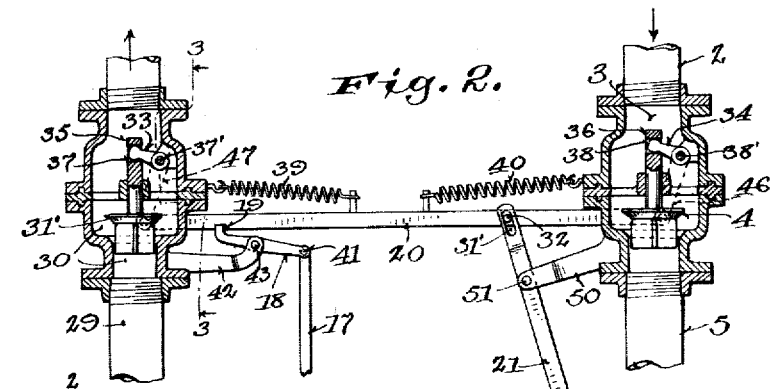
Fig. 2 is a section of the safety valves shown in Fig. 1.
Figure 3:
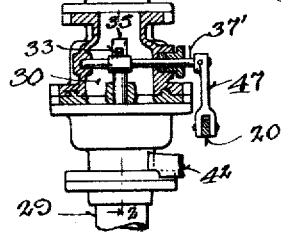
Fig. 3 is a vertical section of one of the valves shown in Fig. 2, drawn at right angles thereto.

1 is a compressor cylinder of ordinary construction. The compressed gas is led to the compression cylinder 1 through the duct 2, valve chamber 3, past the valve 4, through duct 5, valve 6, duct 7, and from thence through the T 8, branches 9 and 10 to the respective ends of the cylinder 1. It will now be obvious that should either of the heads 11 or 12 blow out, or become broken, motion will be communicated from such heads through one of the rods 13 or 14 to the T-shaped lever 15, when such motion will be simultaneously transmitted from such lever 15 through the arm 16, connecting rod 17 to the stop lever 18, whereby the opposite end of said lever 18 will be simultaneously withdrawn from the notch 19 formed in the reciprocating bar 20, when said bar will be acted upon by the lever 21, cord 22 and weight 23, whereby the valves 4 and 31' will be instantaneously closed, and whereby the further escape of gas is prevented.

It will also be obvious that in case the pressure end of said cylinder should be blown out by excessive pressure of the gas which is being compressed upon the opposite side of the piston, and which is being led from said cylinder through the ducts 24 and 25, T 26, duct 27 to the valve 28, duct 29, valve chamber 30 and past said valve 31', such gas will be at once stopped. The cylinder is connected to the stop lever 18 through the rods 13 and 14, T lever 15, arm 16 and rod 17 and said lever 18, whereby both of said valves 4 and 31 will be simultaneously closed by the gravity of said weight 23, acting through said cord 22 and lever 21.

In view of the fact that said lever 21 describes a partial circle as it is operated, it is provided at one end with a slot 31 which is connected with said bar 20 by a pin 32. The bar 20 is connected with said valve 4 and 31' through the levers 33 and 34, and said levers 33 and 34 are connected with the valve stems 35 and 36, through the slots 37 and 38, and shafts 37' and 38'.

In view of the fact that the valve 31' is held open by the escaping gas while the valve 4 is forced toward its seat by the inlet pressure of gas, it becomes necessary or expedient to equalize such pressure, which is done by employing two springs 39 and 40 of different strength, and such springs are connected at one of their ends to a stationary object, and at their opposite ends to said reciprocating bar 20, whereby said bar may be moved in either direction with the same weight or pressure.

The rod 17 is connected at one end to the lever 18 by the pivotal bolt 41, while the lever 18 is connected with the bracket 42 by the pivotal bolt 43, and at its opposite end with the T-shaped lever 15, through the pivotal bolt 41'. The lever 21 is connected with the bracket 50 by the pivotal bolt 51. The T-shaped lever 15 is connected with the bracket 48 by the pivotal bolt 49.

The levers 33 and 34 are located upon the inside of the valve chamber, and connected with the reciprocating rod or bar 20 by the arms 46 and 47, which arms 46 and 47 are upon the outside of said valve chambers, whereby when said rod 20 is moved in either direction motion will be communicated therefrom to said valves 4 and 31' through said rods 37' and 38', arms 33 and 34 and valve stems 35 and 36.

It will, of course, be understood that the cylinder heads 11 and 12 are adapted to be secured to the cylinder 1, and the two parts of the valve chambers 3 and 30 are connected together by bolts in the ordinary manner, although such bolts are not shown. It will, of course, be understood that the cylinder 1 is provided with a piston of ordinary construction, although the same is not shown, and that the piston rod 52 is connected therewith in the ordinary manner.

It will also be understood that when the piston, not shown, moves toward the left gas will be drawn into said cylinder through said ducts, and the valves connected therewith entering the said cylinder through the duct 9, and that as said piston moves toward the right gas will be drawn into the opposite end of said cylinder through the duct 10; that as gas is thus drawn into the respective ends of said cylinder it is simultaneously forced out of the opposite end of said cylinder. As the said piston moves toward the right the gas passes out through the duct 25, and as said piston moves toward the left the gas passes out through the duct 24, escaping as indicated by the arrows.

Having thus described my invention what I claim as new and desire to secure by Letters Patent, is—

1. The combination with the respective ends of a gas compressing cylinder, of inlet and outlet ducts, two check valves, one for controlling the admission of gas to and the other the escape of gas from said cylinder, a reciprocating valve rod, means for connecting such rod to said valves, means for rigidly holding said valves in their open position, and means for simultaneously releasing said valve rod and valves in case either one of said cylinder heads should become broken or blown out, whereby both of said valves will be at once closed, and the further escape of gas stopped.

2. The combination with the respective ends of a gas compressing cylinder, of inlet and outlet ducts, two check valves, one for controlling the admission of gas to and the other the escape of gas from said cylinder, a reciprocating valve rod, means for connecting such rod to said valves, means for rigidly holding said valves in their open position, means for simultaneously releasing said valve rod and valves in case either one of said cylinder heads should become broken or blown out, whereby both of said valves will be at once closed, and the further escape of gas stopped, said closing means comprising a lever, and a flexible connection connected at one end to one end of said lever and at its opposite end to a gravity actuated weight, whereby as said reciprocating valve rod is released said valves will be both automatically closed by the downward movement of said weight.

3. The combination of a cylinder, arms connected with the respective heads of said cylinder, a pair of valves, one for controlling the admission of gas to and the other for controlling the discharge of gas from said cylinder, means for holding said valves in their open position, and means for connecting said valves and said arms together, whereby as either of said cylinder heads become broken or blown out both of said valves will be simultaneously closed.

4. The combination of a cylinder, arms connected with the respective heads of said cylinder, a pair of valves, one for controlling the admission of gas to and the other for controlling the discharge of gas from said cylinder, means for holding said valves in their open position, means for connecting said valves and said arms together, whereby as either of said cylinder heads become broken or blown out both said valves will be simultaneously closed, and a pair of springs, each of which is connected at one end to a fixed point and at its opposite end to said reciprocating rod, whereby said reciprocating rod is adapted to be so controlled by the tension of said springs that it may be moved with the same resistance in either direction.

In testimony whereof I affix my signature in the presence of two witnesses.

MAX LUPINSKI.

Witnesses:
O. C. WEBER,
JAS. B. ERWIN.